United States Patent [19]

Favier et al.

[11] Patent Number: 4,716,716
[45] Date of Patent: Jan. 5, 1988

[54] WORK HEAD

[76] Inventors: Kevin A. Favier; Allan G. Favier, both of 11 Mountain View Dr., Atherton, both of Australia, QLD 4883

[21] Appl. No.: 912,604

[22] PCT Filed: Nov. 25, 1985

[86] PCT No.: PCT/AU85/00290
§ 371 Date: Aug. 25, 1986
§ 102(e) Date: Aug. 25, 1986

[87] PCT Pub. No.: WO86/03090
PCT Pub. Date: Jun. 5, 1986

[30] Foreign Application Priority Data
Nov. 23, 1984 [AU] Australia ............................ PG8271

[51] Int. Cl.⁴ ..................... A01D 34/86; A01D 34/43
[52] U.S. Cl. ........................................ 56/10.7; 56/237
[58] Field of Search ................ 56/10.7, 233, 234, 235, 56/236, 237, DIG. 22

[56] References Cited
U.S. PATENT DOCUMENTS

| 3,087,296 | 4/1963 | Cowles | 56/10.7 |
| 3,604,188 | 9/1971 | Mott | 56/294 |
| 4,074,510 | 2/1978 | Teagle | 56/233 |
| 4,161,858 | 7/1979 | Gerrits | 56/7 |
| 4,241,565 | 10/1980 | Parsons | 56/10.7 |
| 4,502,269 | 3/1985 | Cartner | 56/10.7 |

FOREIGN PATENT DOCUMENTS 2008918  6/1979  United Kingdom ................. 56/233

Primary Examiner—Paul J. Hirsch

[57] ABSTRACT

A workhead for mounting on a boom (15) attached to a tractor. The workhead has a supporting housing (20) which provides mountings for attachment to the boom (24, 26), forward and rearward supporting rollers (21 and 23 resp.) both disposed on a horizontal axis transverse to the line of forward motion of the head, an outer roller (22) on a horizontal axis at an angle to the other rollers and a horizontally rotating shaft (35) with a plurality of blades (36, 37) operable to function as a mower, slasher or rotary hoe. The blades are mounted to be freely rotatable in one angular direction but are locked (65) against rotation in the other.

8 Claims, 11 Drawing Figures

WORK HEAD

TECHNICAL FIELD OF THE INVENTION

This invention relates to agricultural equipment, and more particularly to equipment which may be mounted off the end of a boom.

BACKGROUND ART

It has been proposed to provide various forms of mowers, slashers, etc. in extendible arms off tractors and other like vehicles enabling an hydraulic operation of the arm through action of suitably connected rams. These types of equipment are commonly employed along roadsides, up the sloped surfaces of embankments and other areas where more standard forms of motorised mowers or slashers cannot go. In an orchard there is a need to mow beneath trees without fouling of the trees and an extension is required if a mower or slasher unit is to be extended beneath the trees. The usual unit is not adapted to this task and is unnecessarily complex for the task of mowing over what is essentially a flat surface.

OUTLINE OF THE INVENTION

It is an object of the present invention to provide a work head to be mounted on a boom for operation off a support vehicle so as to be able to work beneath trees and other like objects whilst the support vehicle travels access ways between the trees and other like objects. It is another object of the present invention to provide a work head which is capable of varied selected operation as a mower or slasher and rotary tiller. it is a further object of the present invention to provide a work head which is able to be trailed in and out between objects with a great deal of stability. Other objects and advantages of the present invention will hereinafter become apparent.

The present invention achieves its objects by provision of a work head for mounting off a boom comprising a supporting housing having brakcet means thereon for attachment to the boom, forward roller means for rolling movement in operation over the ground beneath, said forward roller means being disposed on a horizontal axis extending perpendicularly of the line of foward motion of said work head extending along the leading edge of said work head, rearwood roller means for rolling movement in operation over the ground beneath being disposed on a horizontal axis extending perpendicularly of the line of forward motion of said work head extending along the trailing edge of said work head, and an outer roller means for rolling movement in operation over the ground beneath being disposed on a horizontal axis outwardly of the supporting housing in the sense of the boom side being oriented inwardly, said axis being angularly disposed relative to the axes of the forward and trailing roller means, said forward roller means and said outer roller means being disposed end to end across the leading edge of the work head, each of said forward, trailing and outer roller means being cylindrical bodies with conically shaped end pieces leading to shafts providing for their axial rolling support.

BRIEF DESCRIPTION OF THE DRAWINGS

In order that the invention may be more readily understood and put into practical effect, reference will now be made to the accompanying drawings which illustrate a preferred embodiment thereof and wherein.

METHOD OF PERFORMANCE

Figure 1:
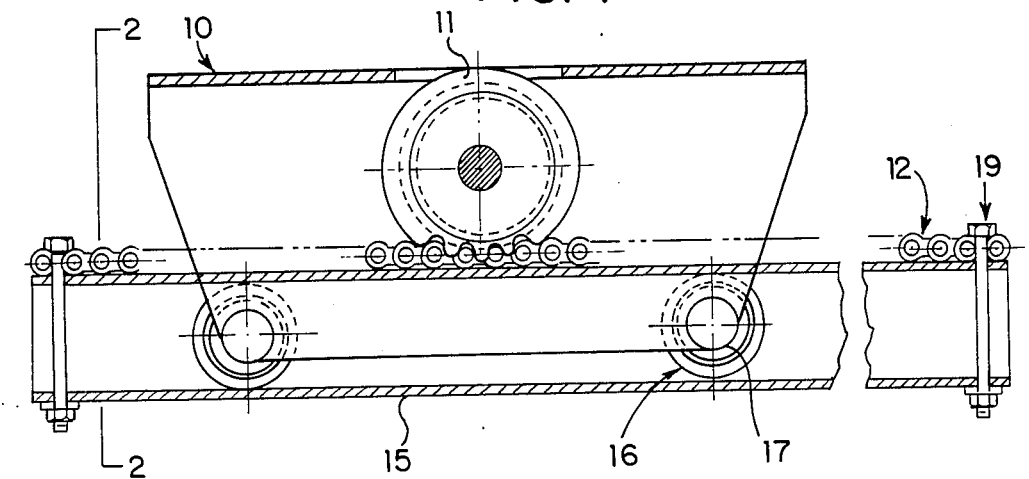
FIG. 1 shows a form of boom to which the work head of the present invention may be applied.

In FIG. 1, item 10 is a boom carrier bracket by which the boom assembly may be mounted to a tractor or other like vehicle. Supported on the boom carrier bracket 10, on a shaft passing therethrough, is a pinion 11 which may be chain type sprocket. The pinion 11 engages with a rack 12 which is a roller chain when a chain sprocket pinion is employed. Also supported on the boom carrier bracket 10 are boom support means 16 which may be freely rotatable wheels on roller bearings on axles 17. The boom 15 may be a hollow length of channelling in which boom support means 16 is located to support the channel section thereupon. The boom and support means 16 is more clearly seen in FIG. 2. Where a roller chain is employed as the rack 12, it may be supported upon the boom and connected at its ends so as to be held in place by suitable connectors 19 which may be through bolts which also serve to prevent the boom support means 16 from running out of the boom at the ends thereof. The connector 19 may provide an end stop means for the boom's travel. The above described structure enables provision of a light weigth boom for operation in orchards, etc., without problems associated with fouling of the boom rollers or drive mechanism by dirt and vegetation which is always thrown up during the operations to be performed by the apparatus.

Figure 2:
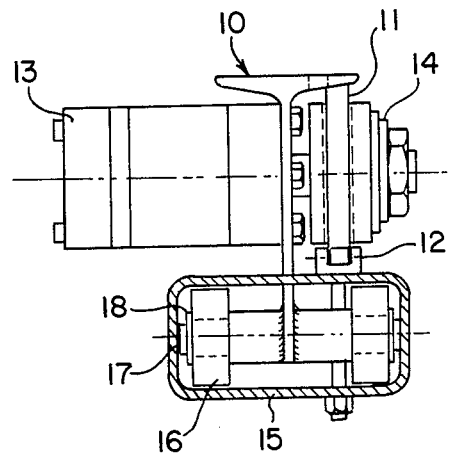
FIG. 2 is a section through the boom of FIG. 1.

FIG. 2 is a view of the boom assembly as showwn in FIG. 1, from another angle, being the section indicated in FIG. 1 with like integers similary numbered. The pinion 11 is shown mounted on the output shaft of a suitable source of motive power 13 which may be an hydraulic motor. Also employed in relation to the pinion 11 as an optional feature is a torque limiter assembly 14 as is further described below. Boom carrier bracket 10 supports at its lower extremities, boom carrier means 16 on axles 17 retained thereto by retaining clip 18. The boom 15 encompasses the boom support means to be supported thereby.

Figure 3:
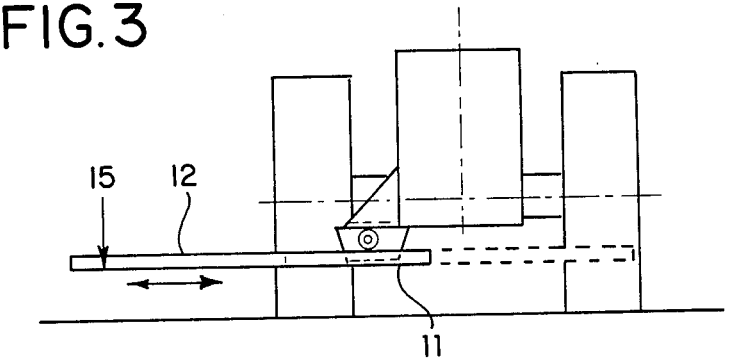
FIG. 3 illustrates the disposition of the boom of FIG. 1 on a tractor.

FIG. 3 shows one possible application of the boom as a rear mounted extendible arm by which a work head may be supported off to the side of a tractor or other like support vehicle. Boom bracket 10 is supported off the back of the tractor and rack 12, and pinion 11, enable movement of the boom 15 from a retracted position shown dotted, behind the tractor, and an extended position projected out to the side of the tractor. This mounting enables a low disposition for the boom so that it is able to operate beneath the lowermost branches of trees without being fouled therein.

Figure 4:
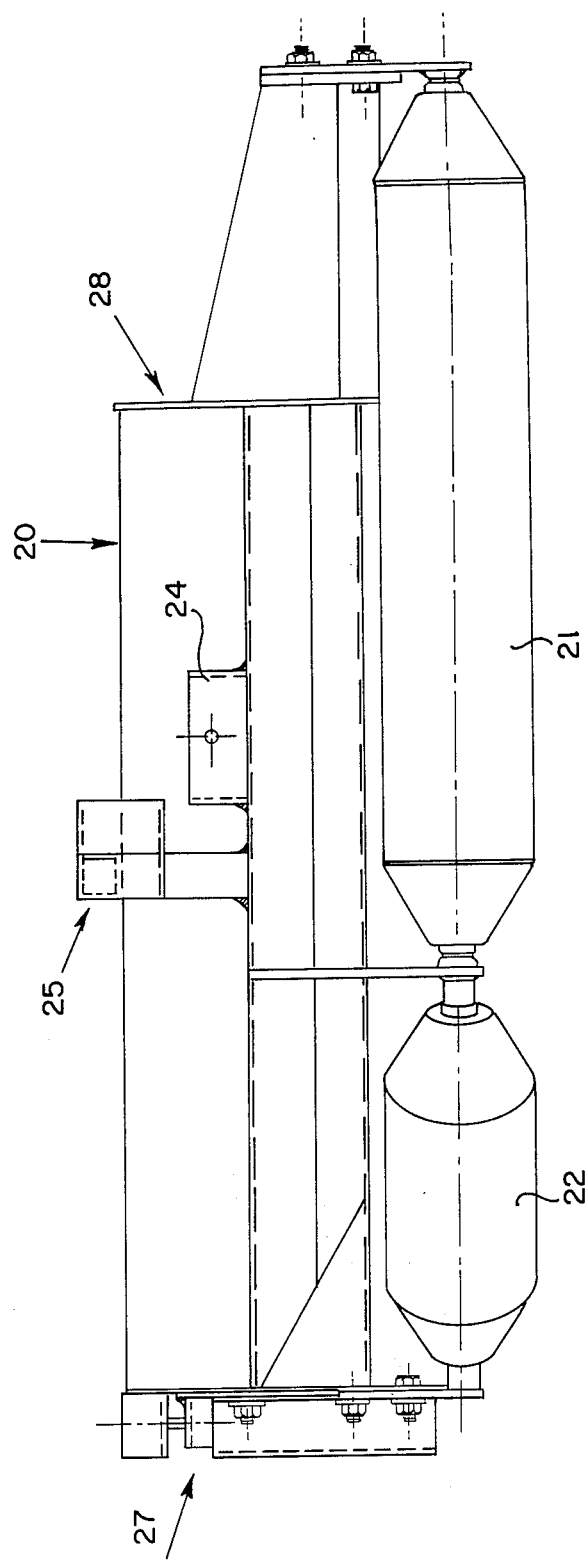
FIG. 4 is a front view of a work head in accordance with the present invention.
Figure 5:
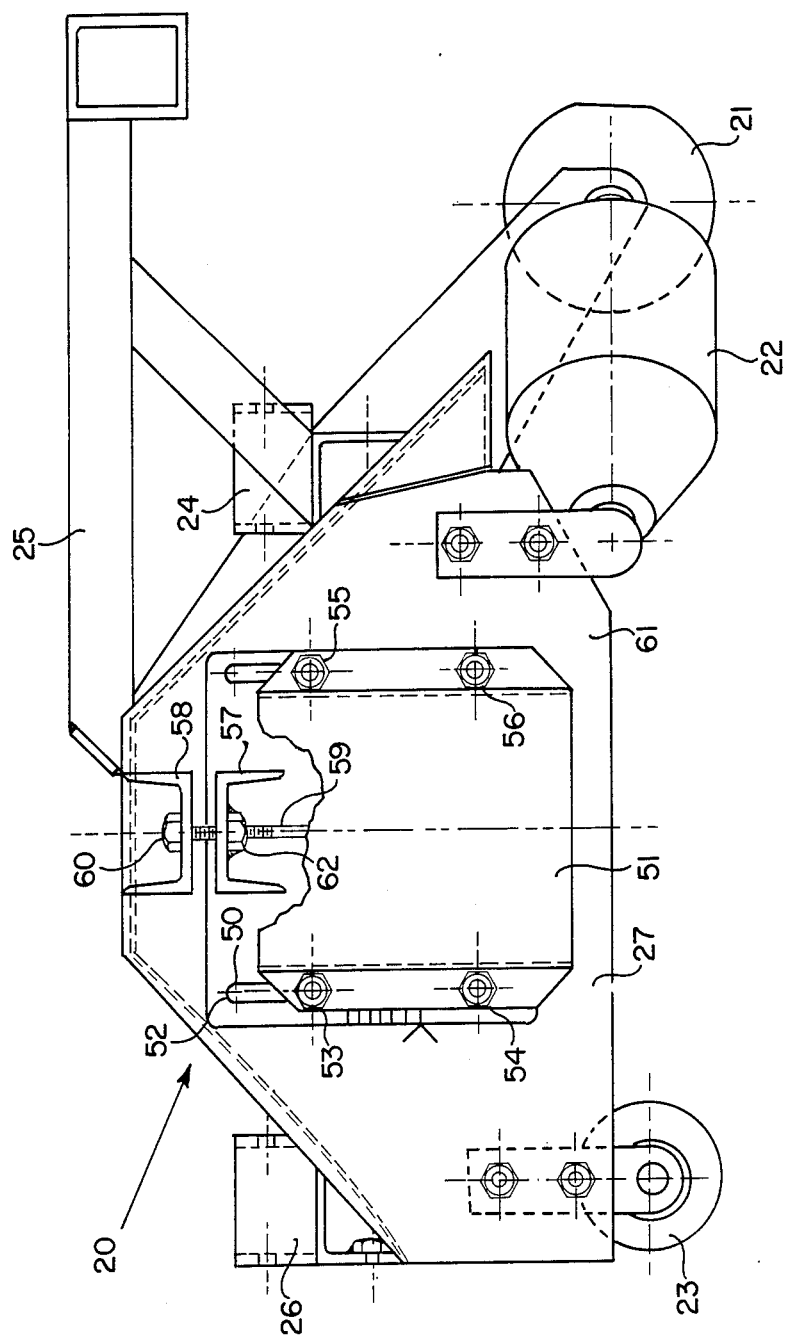
FIG. 5 is an end view of the work head of FIG. 4.

In FIGS. 4 and 5 are seen the external features of a work head in accordance with the present invention comprising a housing 20 on rollers 21 to 23. The housing is mounted to a boom by brackets 24 and 26 with the boom extending sideways of the housing in the sense of FIG. 4 so that forward movement of the work head has it running on forward and rearward rollers 21 and 23 to the right in the sense of FIG. 5. When the work head is to be moved sideways, that motion is assisted by roller 22 and the elongated nature of the rollers and their conical ends which permits them to slide axially over the ground. The particular disposition of rollers illustrated is chosen to maximise the degree of stability of the work head in all its range of movements. The arrangement of rollers enables both movement and constancy of height of the work head as defined by the relative placement of rollers and work piece within the housing. The work head is to be moved both forwardly and sideways. Consequently, the use of wheels, etc., which do not operate in both directions without pivotal mounting, is not practical. Wheels, etc., are also liable to becoming fouled in the undergrowth which the work head is operting on. The rollers now proposed are not subject to such problems. The now descirbed rollers enable sideways movement, in addition to forward motion with a minimum of energy expended in doing so.

In FIGS. 4 and 5 housing 20 is constructed with end plates 27 and 28 which house the bearing and drive structures of the work piece as is described in greater detail below. The bracket 25 is provided to enable the mounting of sensor elements in a forward disposition so as to enable automatic control of the work head wherien, should the work head approach an object, the sensor elements may detect its presence and signal a need to withdraw to the boom extension motor.

Figure 6:
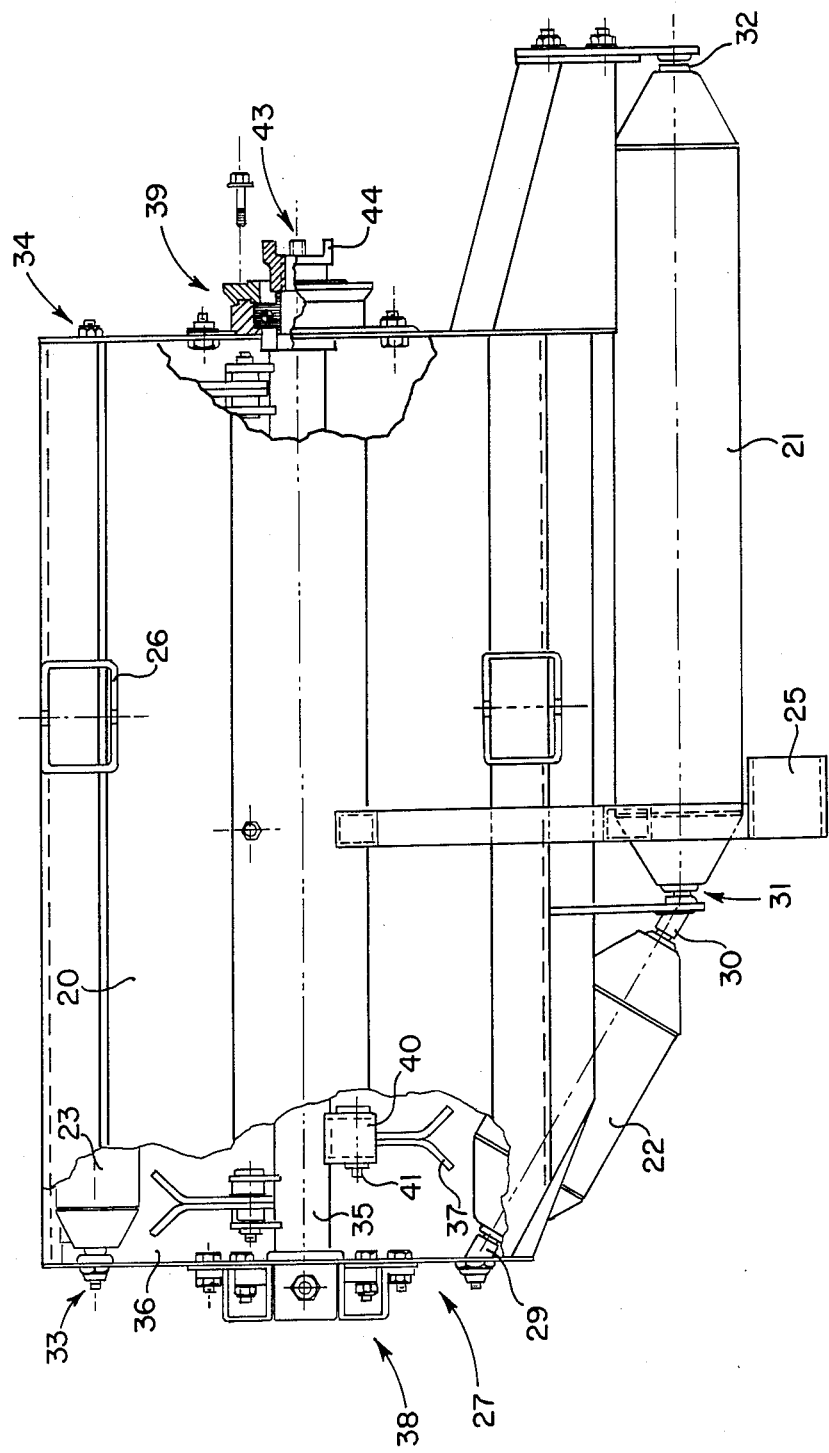
FIG. 6 is a plan view of the work head of FIG. 4.

In FIG. 6, roller 22 is mounted on bearings at 29 and 30; roller 21 on bearings at 31 and 32; and roller 23 on bearings 33 and 34. Within housing 20 is a work piece functioning as a mower with blades such as 36 and 37 mounted to a shaft 35 supported rotatably in bearings at 38 and 39. Blade 37 is mounted in a bracket 40 by a pin mechanism 41 with bracket 40 integral with shaft 35 so that blade 37 turns with shaft 35. End 43 of shaft 35 is provided with means 44 by which shaft 35 can be connected with a suitable power source as is described below.

In the above described work head, the orientation and rollers shown has been found to provide an unusual degree of stability that solved initial problems experienced with more common proposals to place the work head on wheels etc. Roller 22 assists in enabling the work head to move sideways with less effort and fouling in undergrowth than would otherwise be the case. Being self supported, the work head does not require the same strength in the boom as is required with some of the other work heads now in use.

Figure 7:
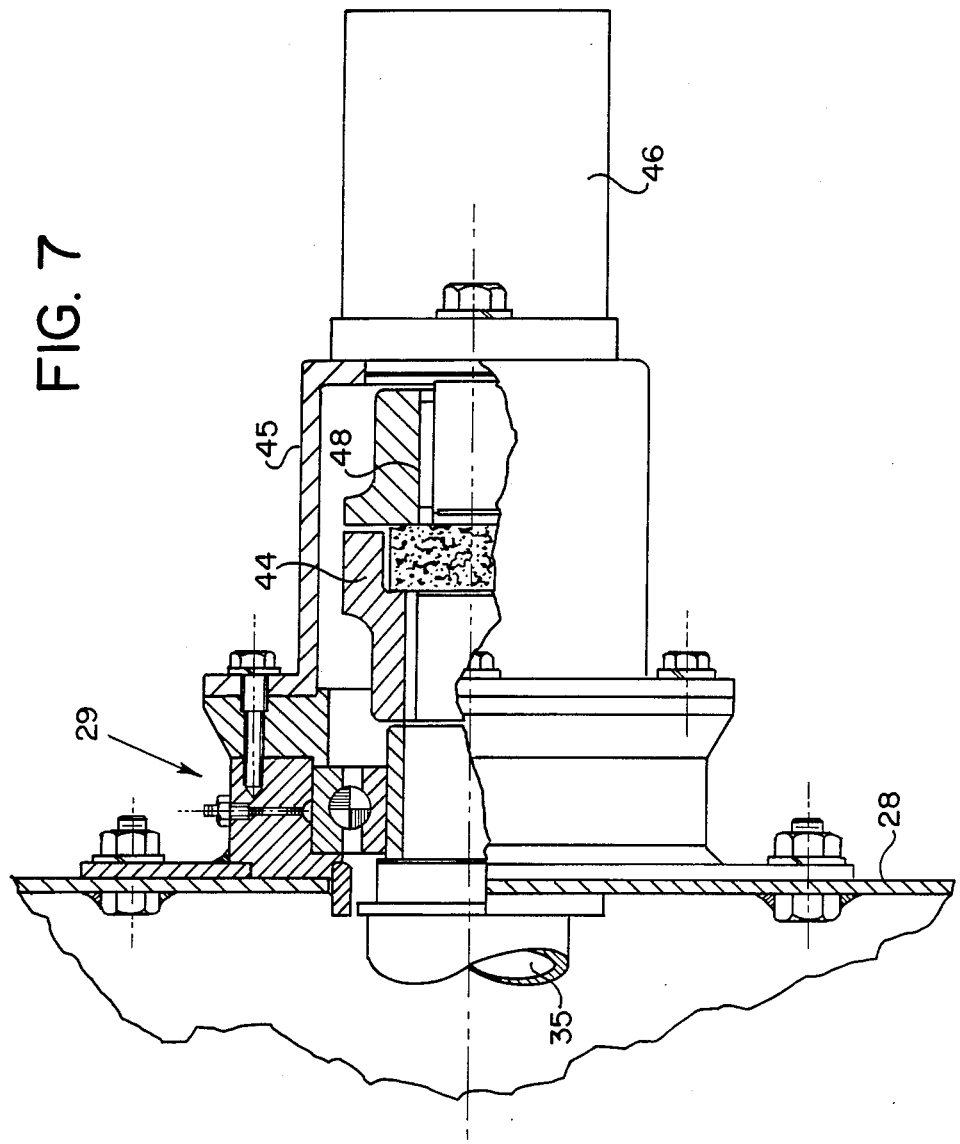
FIG. 7 is a sectional view of a part of the work head of FIG. 4.
Figure 8:
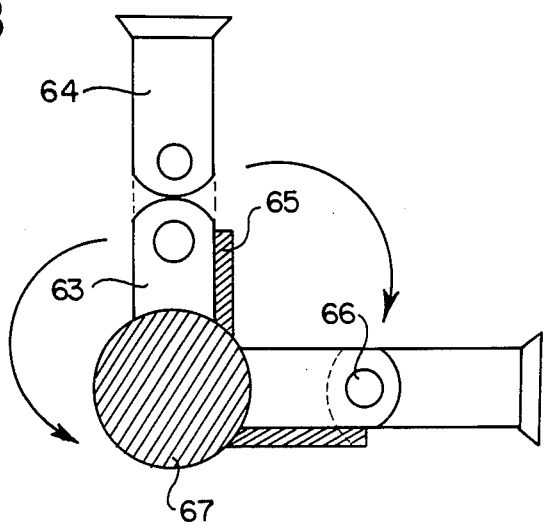
FIGS. 8 to 11 show various views of the components of a multipurpose work head which may be incorporated in a work head according to the present invention.
Figure 9:
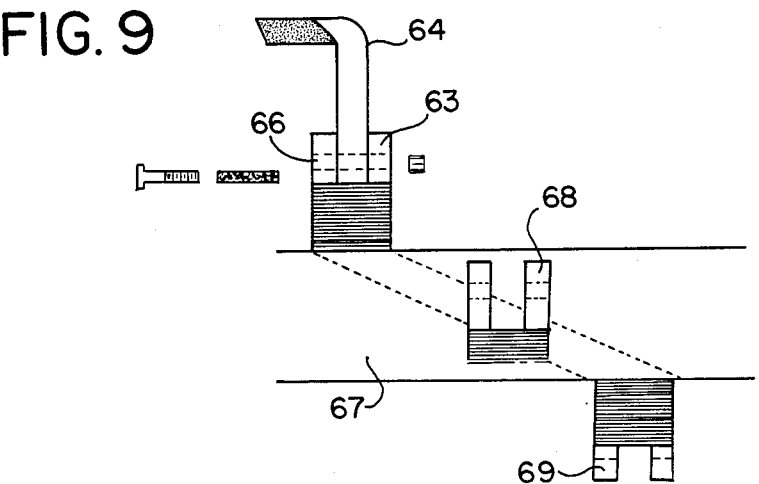
Figure 11:
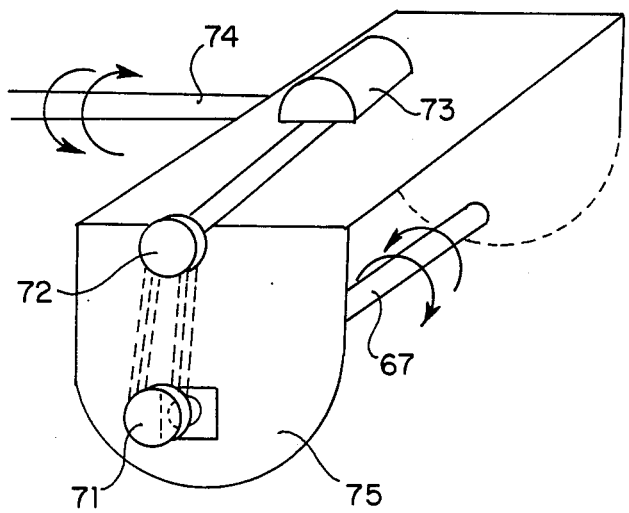
Figure 10:
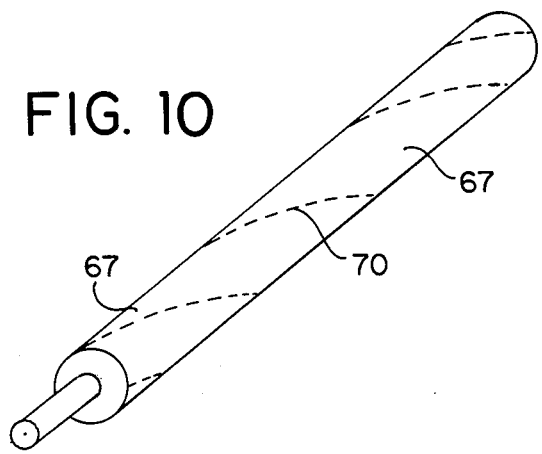

In FIG. 7 is shown a detailed view of shaft 35 mounted in bearing structures 29 in end plate 28. Means 44 is shown connected with an hydraulic motor 46 via means 48 held in place by a housing 45 being bolted to the work head.

In FIGS. 8 to 11 a shaft 67 carries cutter blades 64 mounted between supports 63 pivotally on axis 66 for free movement thereabout. A stop means 65 behind supports 63 limits movement of blade 64 so that it is free to rotate one way but not the other to enable operation both as a flail mower or as a rotary hoe with only a change of direction of rotation and an adjustment of operative height.

The cutter blades are arranged in a spiral pattern 70 on shaft 67 upon a series of identical pairs of supports 68, 69, etc. The shaft 67 may be extended sideways from a support wall 75 providing bearing surfaces for the shaft with a pulley means 71 to provide power. Alternately, an hydraulic motor might be provided at that point to drive the shaft in a selected direction. Pulley 71 is shown interconnected with another 72 driven by a shaft out of gear box 73 powered by a shaft 74 operated by any suitable means.

In FIG. 5 is shown a means whereby the blade carrying shaft inside the supporting housing may be raised or lowered selectively. The end plate 61 of the housing 20 is apertured to pass the shaft therethrough and allow its vertical movement through a range of heights. The shaft is mounted by suitable bearing means to a mounting plate 50 shown provided with a cover plate 51 to enclose the bearing. The top of cover plate 51 is cut away to show details as are set out below. Mounting plate 50 passes bolts 53 to 56 which act to fix the mounting plate 50 to end plate 61. Conveniently, the bolts 53 to 56 are fixed to the end plate 61 to provide outwardly projected threaded shafts for receiving lock nuts. Mounting plate 50 is provided with elongated slots, such as 52, at each bolt so that the height of the mounting plate 50 may be selectively set relative to end plate 61. This way the height of the shaft is set relative to the housing 20. To raise and lower the mounting plate, two brackets 57 and 58 may be provided to the mounting plate 50 and the end plate 61 respectively. The mounting plate 50 can be lifted by action a rotatable threaded shaft 59 screw threaded into bracket 57. Bracket 57 is conveniently provided with a screw thread by the welding of a nut 62 thereto. Threaded rod is provided with an end abutment to locate the end at bracket 58 and provide support for the mounting plate. An abutment is conveniently formed by welding a nut 60 to rod 59.

To support the other end of the shaft, a similar adjustable mounting plate is provided at the other end plate of the housing 20.

The above described apparatus provides a work head which mat be conveniently mounted off a sideways extendible boom to enable work to be performed beneath trees without damage to the trees. The boom may be mounted low down on a support vehicle and with the work head operating at ground level a variety of operations may be performed beneath trees. The above described apparatus may be tracked fowardly and be withdrawn sideways at will. The work head might perform duty as either of a mower or slasher and as a rotary hoe with only a change in rotation and a height adjustment. The work head may be operated off an hydraulic supply which may be a take off source on the support vehicle.

While the above has been given by way of illustrative example, many modifications and variations as would be apparent to persons skilled in the art may be made thereto without departing from the broad scope and ambit of the invention as herein set forth and claimed in the following claims.

We claim:

1. A work head for mounting on a boom (15) comprising a supporting housing (20) having bracket means (24, 26) thereon for attachment to the boom (15), forward roller means (21) for rolling movement in operation over the ground beneath, said forward roller means (21) being disposed on a horizontal axis extending perpendicularly of the line of forward motion of said work head extending along the leading edge of said work head, rearward roller means (23) for rolling movement in operation over the ground beneath being disposed on a horizontal axis extending perpendicularly of the line of forward motion of said work head extending along the trailing edge of said work head, and an outer roller means (22) for rolling movement in operation over the ground beneath being disposed on a horizontal axis outwardly of the supporting housing the sense of the boom side being oriented inwardly, said axis being angularly disposed relative to the axes of the forward (21) and trailing (23) roller means, said forward roller means (21) and said outer roller means (22) being disposed end to end across the leading edge of the work head, each of said forward (21), trailing (23) and outer (22) roller means being cylindrical bodies with conically shaped end pieces leading to shafts providing for their axial rolling support.

2. A work head as claimed in claim 1 wherein the supporting housing (20) contains a rotatable shaft (35) extending thereacross perpendicularly of the direction of forward movement, the rotatable shaft (35) having a plurality of support brackets (40) about the surface thereof, each support bracket (40) having a blade means (37) attached thereto, each blade means (37) being freely pivotally movable in one angular direction from a perpendicular disposition off the shaft, each blade means (37) being locked against movement in the other angular direction from the perpendicular disposition, each said blade means (37) being angularly movable in the same angular direction.

3. A work head as claimed in claim 2 wherein the rotatable shaft (35) is connected to source of motive power (43, 46) whereby the shaft (35) may be rotated selectively in either angular direction and said shaft (35) is mounted for selected vertical movement within said supporting housing to enable height adjustment.

4. A work head as claimed in claim 3 wherein the shaft is mounted at its ends by mounting plates (5) to said supporting housing (20), the mounting plates (50) being bolted thereto, the mounting plate bolt holes (52) being vertically elongated to enable bolting at a selected height.

5. A work head as claimed in claim 2 wherein each supporting bracket and blade means is apertured to receive a pivot pin, a pivot pin being provided through each supporting bracket and blade means pair and the blade means having a portion extending beyond the pivot pin, and a stop means provided to engage the extended portion and prevent its movement in one annular direction.

6. A work head as claimed in claim 2 wherein the blade means comprises a pair of elongaed plate means, each plate means being bent outwardly of the other at its end opposite the pivot pin, the outward vent end portions being provided with cutting edges.

7. A work head as claimed in claim 6 wherein each supporting bracket (41) is provided with a stop means, the stop means engaging the blade means (41) on said supporting bracket at a point between the pivot pin and the blade end.

8. A work head as claimed in claim 4 wherein the shaft (35) is powered by an hydraulic motor (46) mounted to said mounting plate (50) coaxially with the shaft.

* * * * *